United States Patent [19]
Sanders

[11] Patent Number: 5,203,548
[45] Date of Patent: Apr. 20, 1993

[54] CHOPPING BOARDS

[76] Inventor: Mark A. Sanders, 16, Green Lane, Windsor, Berkshire, United Kingdom

[21] Appl. No.: 777,391
[22] PCT Filed: Jun. 8, 1990
[86] PCT No.: PCT/GB90/00896
§ 371 Date: Dec. 6, 1991
§ 102(e) Date: Dec. 6, 1991
[87] PCT Pub. No.: WO90/14785
PCT Pub. Date: Dec. 13, 1990

[30] Foreign Application Priority Data
Jun. 8, 1989 [GB] United Kingdom ............... 8913225

[51] Int. Cl.$^5$ ............................................. A47J 43/00
[52] U.S. Cl. ............................ 269/302.1; 269/289 R
[58] Field of Search ............... 269/302.1, 289 R, 13, 269/15, 303, 315

[56] References Cited
U.S. PATENT DOCUMENTS 120,394  10/1871  Petterson ..................... 269/302.1
1,497,228  6/1924  Purdy ........................... 269/302.1
2,935,107  5/1960  Bertelsen et al. .
4,017,063  4/1977  Brusich ......................... 269/302.1

FOREIGN PATENT DOCUMENTS 803324  9/1936  France ......................... 269/289 R
8802231  11/1988  South Africa .
2052246  1/1981  United Kingdom .
2130080  5/1984  United Kingdom .

*Primary Examiner*—Robert C. Watson
*Attorney, Agent, or Firm*—Young & Thompson

[57] ABSTRACT

The basic product is a chopping board 1 which can be reshaped to form a chute, by grasping a handle part 2 of it, so that chopped food 3 (for example) can be guided into a pan 4 or other receptacle. The flat board has a pair of hinges 5 in it so that it can be reshaped to form a duct or chute. The handle 2 enables the board to be grasped and also effects reshaping of the board from the flat to form a chute. A hinge 6 can also be formed across the board to enable the handle to be lifted about the hinge 6 so as to lock the main hinges 5. However, when the board is in the 'chute mode' the angled sides 7 make the board rigid in the direction of the chute.

8 Claims, 5 Drawing Sheets

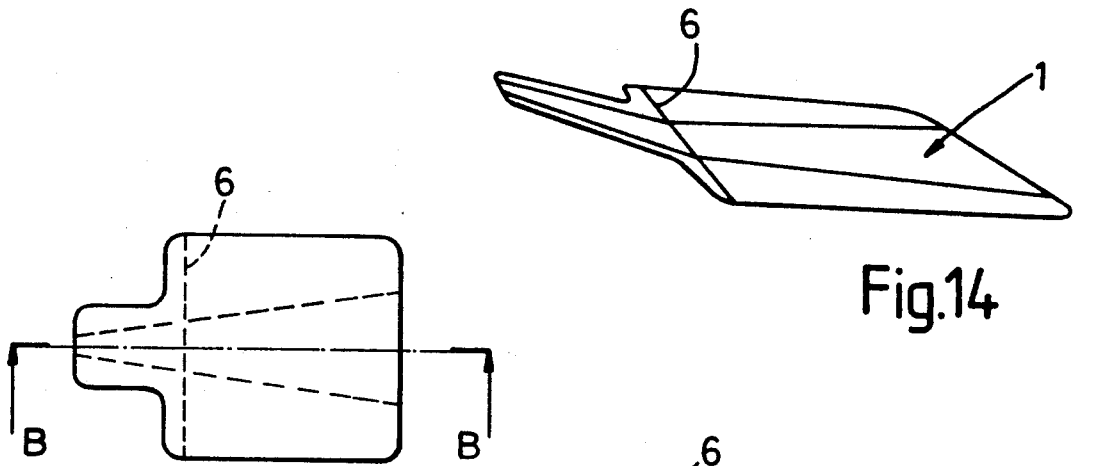
Fig.14
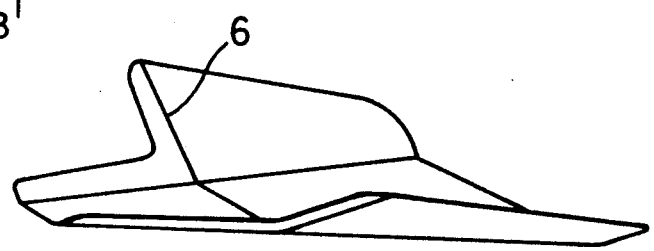
Fig.13
Fig.15
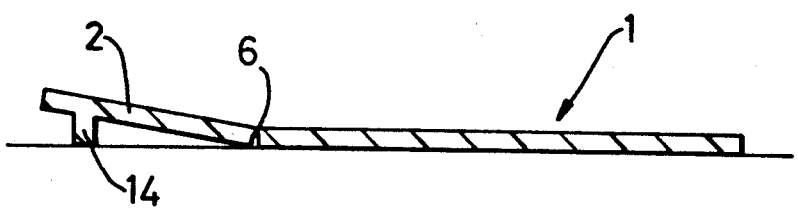
Fig.16
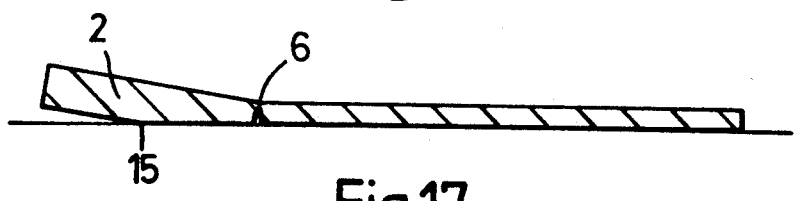
Fig.17
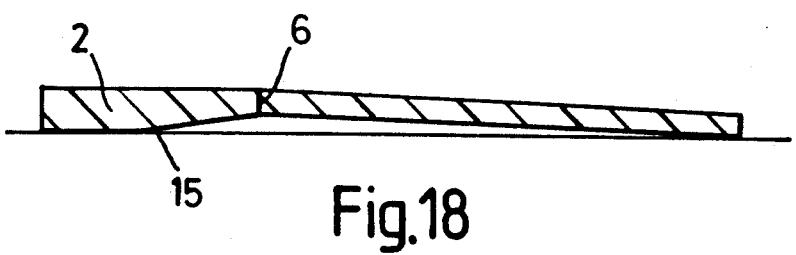
Fig.18

CHOPPING BOARDS

Difficulties are experienced in using a food chopping board in that the chopped material has to be scraped together near a portion of one edge of the board and then scraped off into a receptacle. It is often quite difficult to ensure that the chopped material enters the receptacle; spillages are common. Quite often there are juices which tend to run off other edge portions of the board.

According to the present invention there is provided a chopping board having a planar top surface defining a chopping area and a narrower handle area extending therefrom, the board being flexible (ideally in the form of a hinge) along a line extending through the chopping area and the handle area along the length of the board.

With such a board, once the food has been chopped, the sides of the board can be tilted towards one another along the flex line to define a chute from which the chopped material can readily be fed into a receptacle.

In the preferred arrangement there will be at least two longitudinal hinges in the board so that a chute can be defined with a flat central section and angled side walls. Preferably the two hinges will diverge away from one another.

Ideally the board will additionally incorporate a hinge which extends from one side to the other, thus cutting through the longitudinal hinge(s). The hinge extending across the board will preferably be positioned near to the handle area; the handle can then be tilted up with respect to the rest of the board, thus maintaining the chopping area in a flat condition since the longitudinal hinge(s) will be rendered inoperative. In this form of construction the handle could have a projection or two or more projections on its underneath surface which will naturally cause the handle to tilt upwardly when the chopping board is placed on a flat surface. These projections could be near the centre line or near the outer edges of the underside of the handle portion.

In the preferred arrangement biassing means will be provided to cause the board to tend to adopt a flat condition. Such biassing means could be weights in the outer edges of the board or some form of spring member.

A portion at least of the handle area could be so constructed that edge portions project upwardly out of the plane of the board to enable the user to grasp the board easily. Pressure on the upraised edge portions towards one another would then automatically cause tilting of the sides of the board towards one another along the hinge line or lines.

The invention may be performed in various ways and preferred embodiments thereof will now be described with reference to the accompanying drawings, in which:

FIGS. 13-15 show operational features of a modified chopping board of this invention;

FIGS. 16-18 illustrate modifications to the type of board shown in FIG. 13;

Figure 1:
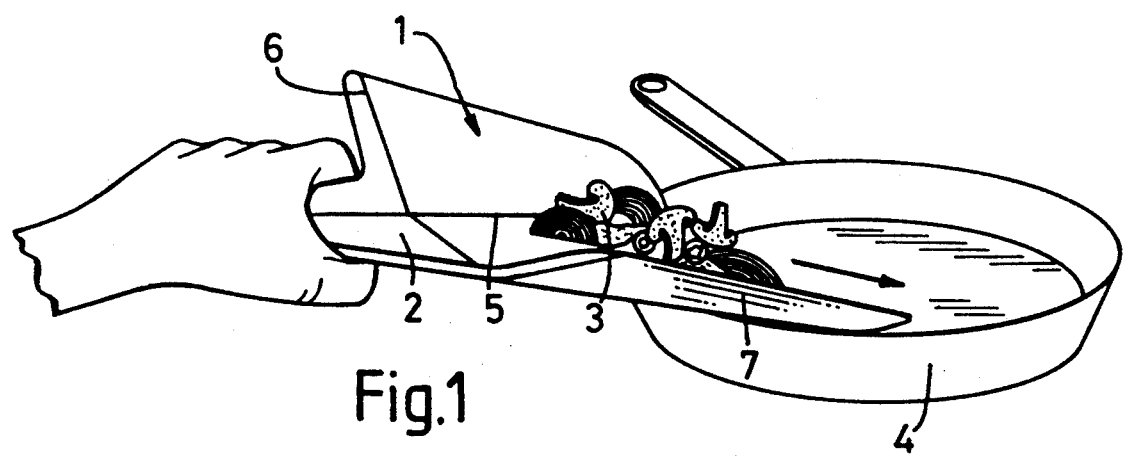
FIG. 1 illustrates a basic chopping board of this invention in use.
Figure 2:
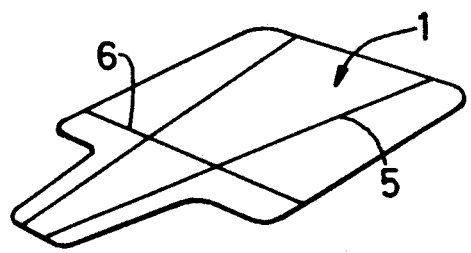
FIGS. 2-4 show the board of FIG. 1 in various operational states.
Figure 3:
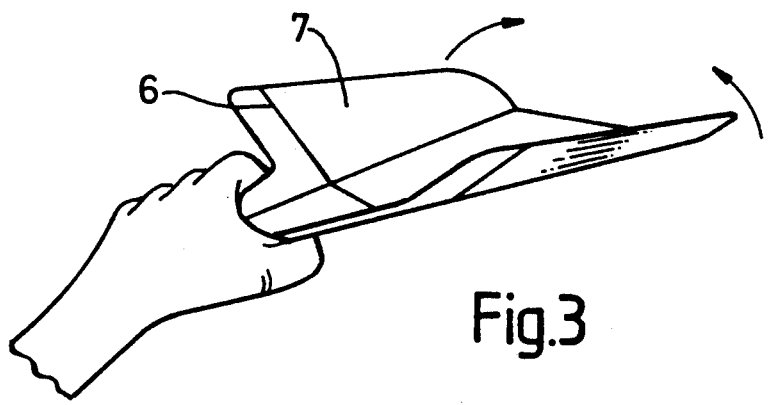
Figure 4:
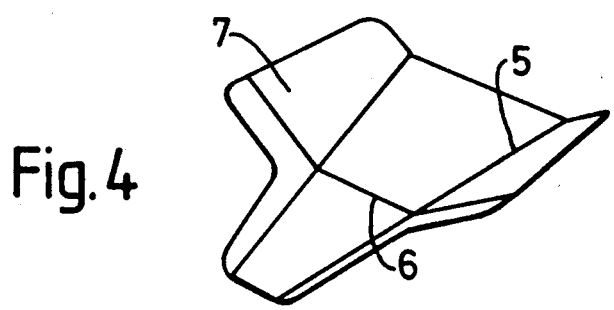

The basic product shown in FIG. 1 is a chopping board 1 which can be reshaped to form a chute, by grasping a handle part 2 of it, so that chopped food 3 (for example) can be guided into a pan 4 or other receptacle. As can be seen from FIGS. 2 to 4 the product consists of a flat board 1 with a handle detail 2 that allows it to be securely held with one hand. The flat board has a pair of hinges 5 in it (or is flexible) so that it can be reshaped to form a duct or chute. The handle 2 is attached to the board (or is made as part of the board) to enable the board to be grasped and also to reshape the board from the flat to form a chute. A hinge 6 can also be formed across the board to enable the handle to be lifted about the hinge 6 so as to lock the main hinges 5. However, when the board is in the 'chute mode' the angled sides 7 make the board rigid in the direction of the chute.

Figure 5:
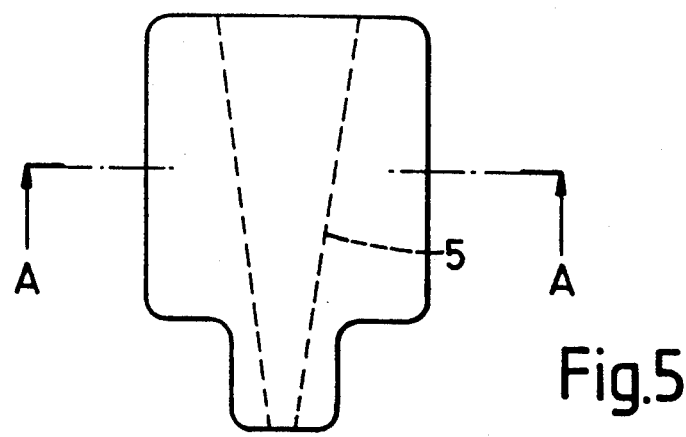
FIGS. 5-9 are illustrations of modified versions of chopping boards of this invention.
Figure 6:
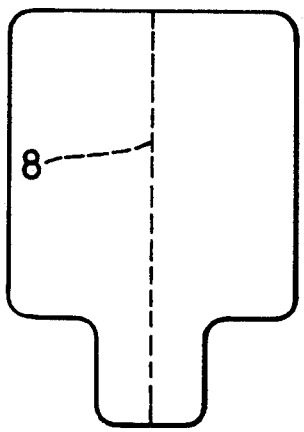
Figure 7:
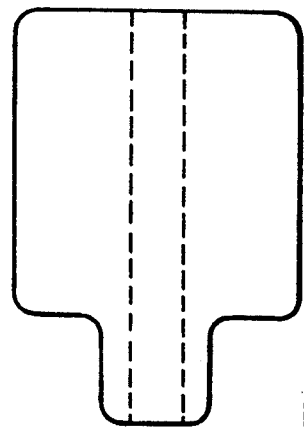
Figure 8:
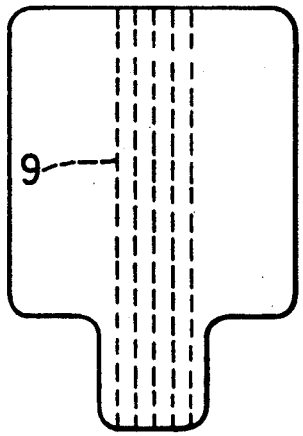
Figure 9:
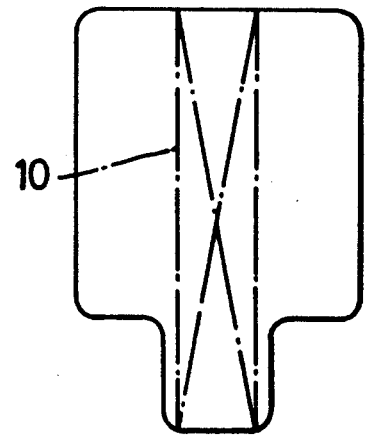

A number of possibilities are illustrated in FIGS. 5 to 9. FIG. 5 is a more standard version with two angled hinges 5. In a simplified arrangement a single hinge 8 (FIG. 6) could be used. A double straight hinge arrangement is shown in FIG. 7. This can be expanded to provide a central region with a series of longitudinally extending hinges 9 (FIG. 8). As an alternative the longitudinal central area 10 of the board and handle could be of a flexible material, as generally illustrated by the crossing lines. Indeed, the whole of the product could be made from a flexible material so that, in particular, it can flex along the line extending through the board 1 and the handle 2.

Figure 10:
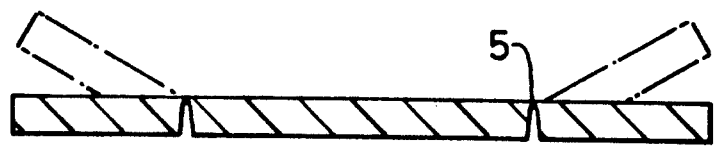
FIGS. 10-12 are sectional views illustrating the structure of chopping boards of this invention.
Figure 11:
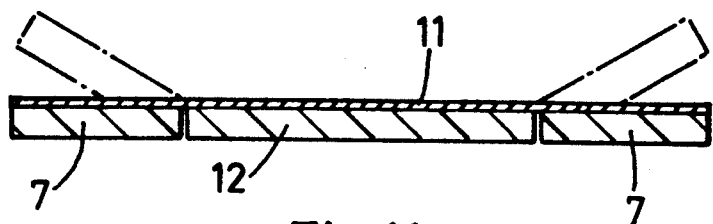
Figure 12:
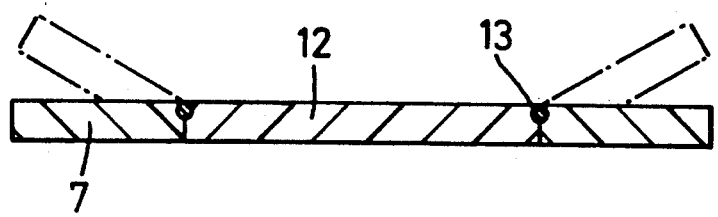

The materials forming the board and handle could be appreciated from the proposal set out in FIGS. 10 to 12 which are cross-sections along line A—A of FIG. 5. In FIG. 10 the product is made from a polypropylene material (or other rigid plastics material) to form panels but with local thinning to define integral hinges 5. As an alternative, (FIG. 11), a thin sheet of flexible hard-wearing material 11 forms the working surface and has blocks of rigid material (defining the side panels 7 and the central panel 12) attached to it. Where the material 11 forms a thin junction between the blocks it will act as the hinge.

In the arrangements shown in FIG. 12, blocks 7 and 12 are interconnected by hinge pins 13.

It is important that when the board is in 'chopping mode' it is flat. This means the hinges must not keep any set, and lie completely flat. It could be a problem with integral, flexible or stiff conventional hinges which may tend to stay angled. As shown in FIGS. 13 to 16 the board may have an additional cross-hinge 6. This relies on the concept that when a rigid flat plate is divided by two hinges across it at angles to each other, only one hinge can flex at a time, and the other hinge is locked in the flat position.

With an extra hinge 6 across the chopping board, the board is held flat in the chopping mode (FIG. 14) by putting a slight angle onto the extra cross hinge by slightly raising the handle. This leaves the chopping area flat and free from obstructions. The board also keeps its rigidity in the chute mode (FIG. 15), the extra cross hinge 6 being locked in this position. This concept lends itself ideally to one-piece construction with integral hinges.

The handle detail 2 may be raised by hand to flatten the chopping area, or it might have an extension 14 on the under side of the centre panel to automatically raise the handle detail 2 when the chopping area is pushed down onto the worktop, as shown in FIG. 16 which is a cross-section on line B—B of FIG. 13.

A further possibility is shown in FIGS. 17 and 18, where the handle 2 rocks on a fulcrum 15 formed on the base of the handle 2. When the end of the handle 2 is pressed down the board is flattened through the cross hinge 6. The handle is then grasped to form the chute shape.

Figure 19:
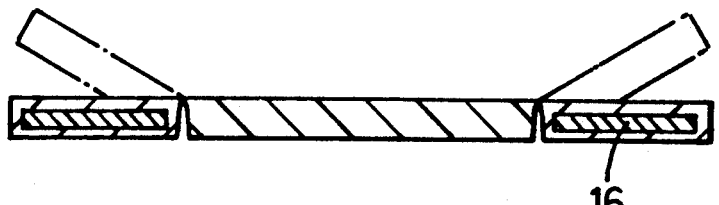
FIG. 19 is a section through a further example of a construction of the chopping board of FIG. 13.

Another board flattening effect is achieved by attaching or enclosing material 16 of a higher density on or within the outer panels 7 will flatten the board by gravity (FIG. 19).

Figure 20:
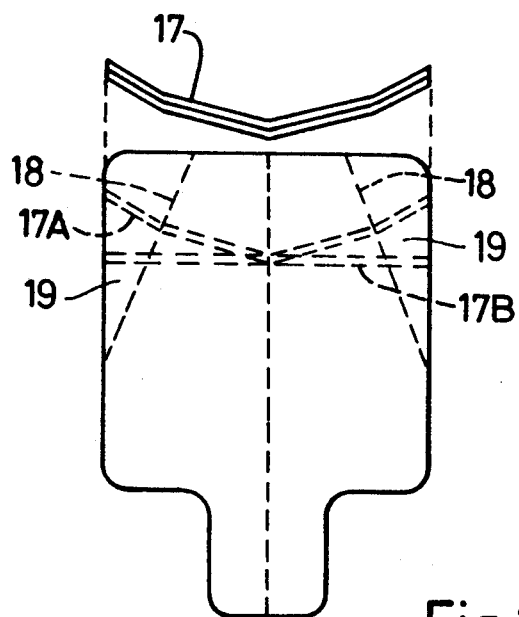
FIGS. 20 and 21 show a chopping board of this invention with a stiffening wire.
Figure 21:
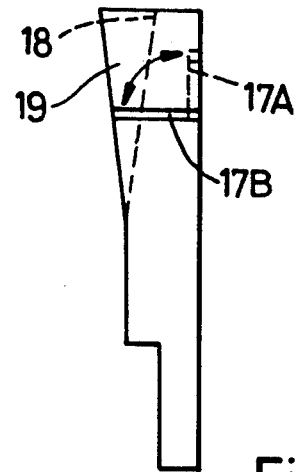

A wire 17 or rigid former may be bent to the chute profile (FIGS. 20 and 21) and is arranged to rotate in slots, to make the board flat when the wire lies flat below the board (17A), or into a chute when the wire bends in the same plane as the chute profile (17B). The board may have additional side hinges 18 defining outer panels 19. When the wire 17 rotates to condition 17A it also moves the outer panels 19 to form a chute.

Figure 22:
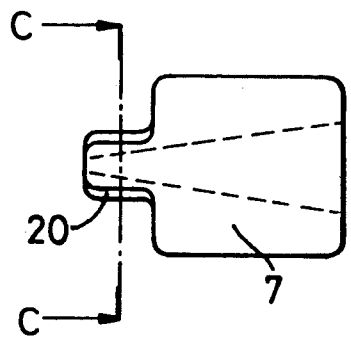
FIGS. 22-24 illustrate a chopping board of this invention with a modified handle portion.
Figure 23:
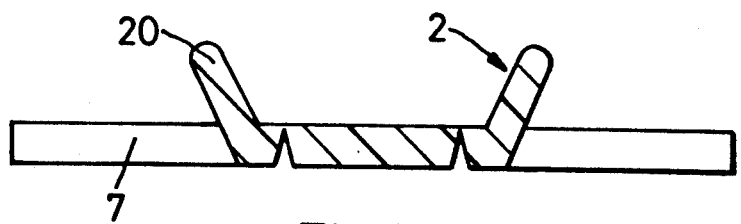
Figure 24:
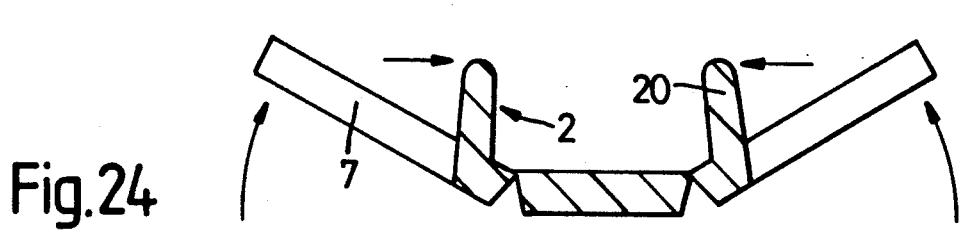

As shown in FIGS. 22 to 24 (where FIGS. 23 and 24 are sections on line C—C of FIG. 22), the edges 20 of the handle may be raised above the hinge line. The board will then more easily go into the chute mode when grasped. This feature can be used in conjunction with other features described previously.

I claim:

1. A chopping board having a large planar top surface defining a chopping area and a narrower handle area extending therefrom, the board being flexible along a longitudinal line which extends fully through both the chopping area and the handle area along the length of the board, the board also incorporating a hinge positioned near to the handle area of the board along a lateral line which extends fully across the board from one side to the other, so as to intersect said longitudinal line.

2. A chopping board according to claim 1, wherein the board incorporates at least two longitudinal hinges extending along the length of the board.

3. A chopping board according to claim 2, wherein the two longitudinal hinges are not parallel to one another.

4. A chopping board according to claim 1, wherein the handle has at least one projection on its underneath surface to cause the handle to tilt upwards when the chopping board is placed on a flat surface.

5. A chopping board according to claim 1, wherein biassing means is provided to cause the board to tend to adopt a flat position.

6. A chopping board according to claim 5, wherein the biassing means comprises weights in the outer edges of the board or a spring biassing member.

7. A chopping board according to claim 1, wherein the handle area is constructed so that edge portions project upwardly out of the plane of the board.

8. A chopping board according to claim 1, wherein a wire or other rigid member formed in a generally curved shape is arranged to rotate in a slot in the base of the board so as to be movable between conditions where the shaped member lies flat below a flattened board or bends in the same plane as the profile of the chute formed when the board is flexed.

* * * * *